G. R. ADAMS.
RAT TRAP.
APPLICATION FILED FEB. 5, 1913.

1,072,375.

Patented Sept. 2, 1913.

Witnesses:

Geo. R. Adams
Inventor:

UNITED STATES PATENT OFFICE.

GEORGE R. ADAMS, OF JACKSONVILLE, FLORIDA.

RAT-TRAP.

1,072,375.

Specification of Letters Patent.

Patented Sept. 2, 1913.

Application filed February 5, 1913. Serial No. 746,395.

*To all whom it may concern:*

Be it known that I, GEORGE R. ADAMS, a citizen of the United States, residing at Jacksonville, in the county of Duval and State of Florida, have invented certain new and useful Improvements in Rat-Traps, of which the following is a specification, reference being had to the accompanying drawings.

This invention relates to new and useful improvements in traps and more particularly to a rat trap which belongs to the class known as dead fall traps, the object of the invention being to provide a trap of the above character which can be quickly and readily arranged in a set position and which is especially effectual in retaining the animal after the trap has been sprung.

Another object of the invention is to provide a trap of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 2:
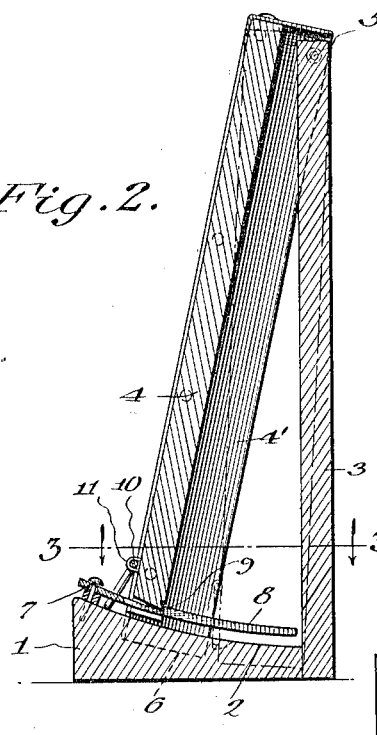
Figure 1:
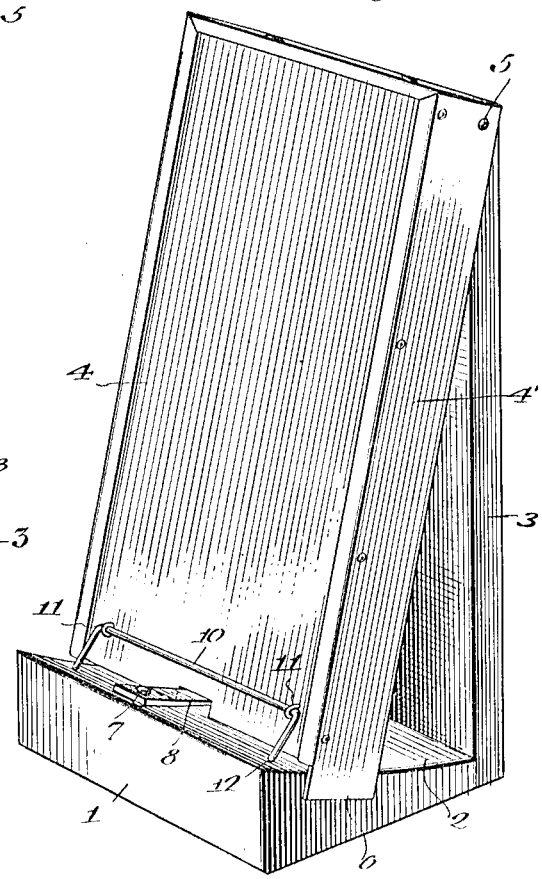
Figure 3:
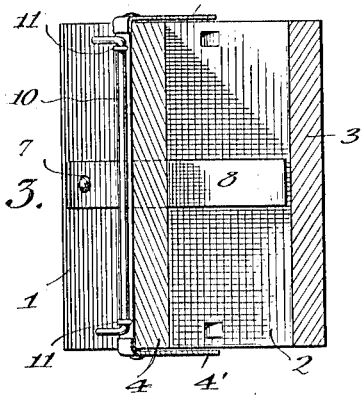
Figure 4:
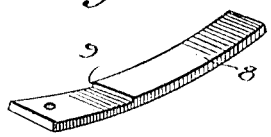

Figure 1 is a detail perspective view of a trap constructed in accordance with my invention; Fig. 2 is a vertical sectional view; Fig. 3 is a transverse sectional view taken on the line 3—3 of Fig. 2; and Fig. 4 is a detail perspective view of the trigger member.

Referring more particularly to the drawings, 1 indicates the base of my improved trap, the upper face of which is provided with a substantially arcuate inclination, as shown at 2, which extends from one longitudinal edge of the base to the other. Thus it will be seen that by having the base member formed with the inclination 2, it will be considerably higher at the forward or front end of the same than at the rear side thereof. Secured to the rear side of the base member 1 is an upright wall 3, said wall being secured in any suitable manner to the edge of the base. This wall, if it is desired may be termed what is known as the dead wall and may be made in various dimensions according to the use of the trap or the size of the animals to be caught thereby.

Arranged in front of the dead wall 3 and pivotally secured to the upper end thereof is a movable jaw member 4. This jaw member is provided upon its longitudinal edges and at its upper edge with a metal plate which projects beyond the inner face of the jaw and forms rearwardly projecting flanges 4' so that when the trap is in its inoperative position, the wall 3 will be inclosed by these flanges. It will be readily apparent from the accompanying drawings that the jaw 4 is pivotally secured to the wall or rigid jaw 3 by means of the pins 5 which project through the flange at the upper edge of the movable jaw and extend into the longitudinal edges of the rigid jaw at the upper end thereof, thus pivotally connecting the movable jaw with the upper end of the rigid jaw. As illustrated in the accompanying drawings, the flange upon the longitudinal edges of the movable jaw, extend below the lower end thereof and are arranged upon the outer side of the ends of the base member 1, as shown at 6, so as to prevent lateral movement of the lower end of the movable jaw.

Mounted upon the upper face of the base member at the front edge thereof is a pin 7, to which is pivotally secured the trigger member 8. The trigger member 8 extends inwardly to a point adjacent the rigid jaw 3 and is provided adjacent its outer end with a shoulder 9 against which the lower tapering edge of the movable jaw 3 is adapted to engage to retain the movable jaw in its operative position. As shown in Fig. 2, the movable jaw has been set in its operative position and the bait arranged upon the inner end of the trigger 8. Thus an animal entering between the jaws from either side thereof and tampering with the bait upon the trigger will be readily caught between the jaws as a very slight movement of the trigger member will disengage the lower tapering edge of the movable jaw from the shoulder 9.

Pivotally secured upon the front side of the movable jaw 4 at the lower end thereof is a retaining member 10. This retaining member comprises a single length of heavy wire, or a rod of sufficient weight may be used if desired, and which is pivotally mounted within the eyes 11 secured to the movable jaw adjacent the lower edge thereof. The ends of the member 10 are bent at right angles and slightly pointed, as shown at 12, said ends being adapted to slide upon the inclination 2 of the base 1, as the movable jaw moves inwardly toward the rigid jaw 3. Thus it will be apparent that an animal which has tampered with the bait and released the movable jaw, will be caught between the two jaws and any attempt on the part of the animal to withdraw from between the jaws, by pushing the movable jaw outwardly will be frustrated by means of the member 10, the ends of which will engage within the base and prevent outward movement of the movable jaw.

From the above description taken in connection with the accompanying drawings, it will be readily apparent that I have provided a simple and durable rat trap of the dead fall character which can be quickly and readily set to its operative position and which is so arranged that it can be easily sprung when any attempt on the part of the animal is made to remove the bait from the inner end of the trigger 8. It will also be apparent that after the animal has become engaged between the jaws, it will be also impossible for the same to get out from between the jaws at either side of the trap on account of the flanges 4' and as the member 10 prevents the animal from pushing the movable jaw forward it will be readily seen that the device is extremely effectual in its operation. It will also be apparent that the trap is extremely simple in construction and can be manufactured at an extremely low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A trap of the class described including a base having an arcuate inclination upon its upper face, a rigid upright jaw member secured to one edge of the base, a movable jaw member pivotally secured to the upper end of the rigid jaw, a pivoted trigger carried by the base and adapted to be engaged by the lower end of the movable jaw to hold said jaw in position away from its vertical position, said trigger being adapted to be engaged at its inner end to release the movable jaw, and means for preventing outward swinging movement of the movable jaw after the same has been released.

2. A trap of the class described including a base having an arcuate inclination upon its upper face, a rigid upright jaw secured to one edge of the base, a movable jaw having a rearwardly projecting flange upon its longitudinal edges and upon the upper end, the upper end of said movable jaw being pivotally secured to the upper end of the rigid jaw, a trigger member carried by the base and adapted to engage the lower end of the movable jaw to hold the same in position away from its vertical position, said trigger being adapted to be engaged at its inner end to release the movable jaw and a retaining member pivotally mounted upon the movable jaw and adapted to engage the base to prevent outward swinging movement of said jaw after the same has been released.

3. A trap of the class described including a base, an upright rigid jaw secured to one edge thereof, a movable jaw having rearwardly projecting flanges formed upon its longitudinal edges at one end thereof, said movable jaw being pivotally secured to the upper ends of the rigid jaw, said flanges upon the longitudinal edges of the movable jaw extending downwardly beyond the upper face of the base to prevent lateral movement of the movable jaw, a trigger carried by the base and adapted to engage with the lower end of the movable jaw to retain the same in its operative position, said trigger being adapted to be engaged at its inner end to release the movable jaw and a pivotally mounted retaining member carried by the movable jaw and adapted to engage the base to prevent lateral swinging movement of said jaw after the same has been released.

In testimony whereof I hereunto affix my signature in the presence of two witnesses.

GEORGE R. ADAMS.

Witnesses:
 PETER T. L. QUEEN,
 R. H. DAVIS.